United States Patent [19]

Orlowski et al.

[11] 4,276,318
[45] Jun. 30, 1981

[54] APPARATUS AND METHOD FOR MOLDING MEAT PATTIES

[75] Inventors: Gerald J. Orlowski, Scottsdale, Ariz.; Rodney D. Wicklund, Denver, Colo.; Richard D. Sandlas, Littleton, Colo.; Walter W. Weibler, Arvada, Colo.

[73] Assignee: Armour and Company, Phoenix, Ariz.

[21] Appl. No.: 118,212

[22] Filed: Feb. 4, 1980

Related U.S. Application Data

[63] Continuation of Ser. No. 959,384, Nov. 9, 1978, Pat. No. 4,193,167.

[51] Int. Cl.³ .......................... B29C 1/00; B29C 3/02; B29C 3/04; A22C 17/00
[52] U.S. Cl. ...................................... 426/513; 17/32; 100/98 R; 100/264; 100/269 A; 100/DIG. 10; 264/40.1; 264/138; 264/299; 425/135; 425/139; 425/150; 425/348 R; 425/351; 425/422; 425/556; 425/576; 425/588
[58] Field of Search ............... 425/261, 346, 347, 351, 425/436, 553, 554, 556, 572, 586, 587, 588, 576, 428, 434, 135, 139, 142, 150, 228, 305.1, 361, 422, 157, 159, 296, 297, 423, 562, 354, 355, 356, 353, 348 R; 100/DIG. 10, 98 R, 264, 269 A; 17/32; 426/414, 512, 513; 264/40.1, 138, 299

[56] References Cited

U.S. PATENT DOCUMENTS

| 2,354,029 | 7/1944 | Kingston | 425/350 |
| 3,102,304 | 9/1963 | Divers | 425/576 |
| 3,179,041 | 4/1965 | Luthi et al. | 100/264 |
| 3,461,483 | 8/1969 | Felstenhausen | 425/305.1 |
| 3,633,245 | 1/1972 | Partos | 17/32 |
| 3,982,035 | 9/1976 | Orlowski | 426/454 |
| 4,065,241 | 12/1977 | Orlowski | 425/228 |

Primary Examiner—W. E. Hoag
Attorney, Agent, or Firm—Frank T. Barber; Albert W. Bicknell

[57] ABSTRACT

A molding apparatus and method are provided for forming patties from an agglomerable edible material such as meat. The apparatus includes a turret which rotates between a feed station where the edible material is fed upwardly under pressure into one of a plurality of mold cavities and a discharge station where each formed patty is ejected by a piston. An improved sealing means is provided for effecting sealing engagement of a feed spout assembly with the bottom surface of the rotating turret. An improved cut-off band is also provided for separating the formed patties from the turret at the discharge station. Reciprocation of the piston in each mold cavity is regulated by a control means which includes means for limiting the free upward movement of the piston until the cavity opening is fully aligned with a feed opening in the feed spout assembly.

8 Claims, 8 Drawing Figures

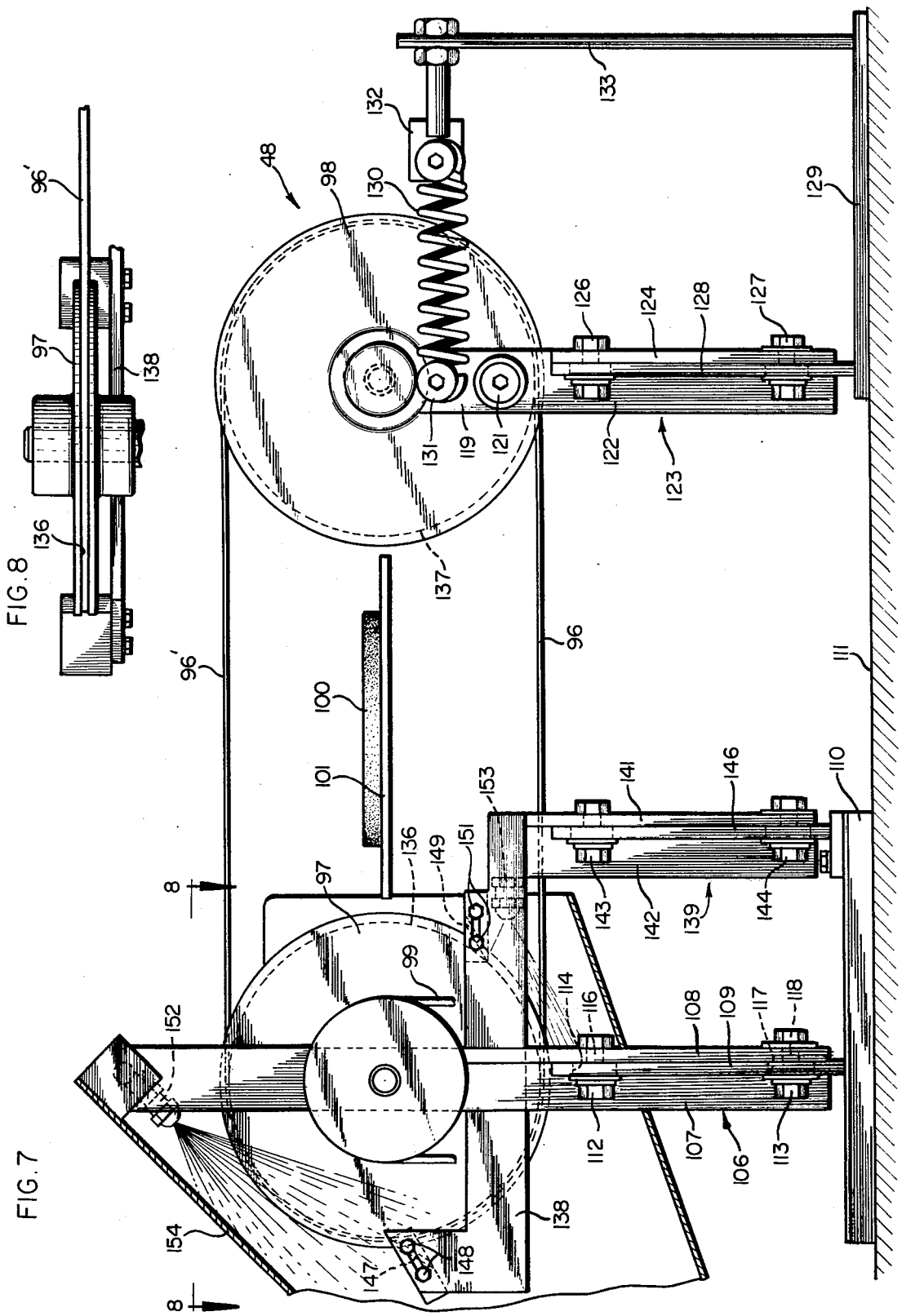

APPARATUS AND METHOD FOR MOLDING MEAT PATTIES

This is a continuation of application Ser. No. 959,384, filed Nov. 9, 1978 now U.S. Pat. No. 4,193,167.

This invention relates to improvements in an apparatus for forming patties from an agglomerable edible material such as meat. More particularly, the invention relates to improvements in a patty-forming apparatus of the general type described in the Orlowski U.S. Pat. No. 4,065,241.

BACKGROUND OF THE INVENTION

Meat for use in making hamburger patties or the like is ordinarily provided in the form of large frozen blocks. In the prior art machines and methods for forming patties the frozen blocks of meat are broken up into smaller pieces which are then cut into flakes and warmed to 30° F. or higher before being introduced into the supply hopper of the patty-forming machine. The warming of the frozen meat flakes has been considered necessary to render the meat sufficiently soft or plastic to be handled by the machine and formed into cohesive patties.

A particularly advantageous patty-forming machine is described in the Orlowski U.S. Pat. No. 4,065,241 and comprises a power driven turret mounted for rotation on a vertical axis with a plurality of patty-forming molds being provided on the turret. Each mold comprises a bottom opening cavity in the turret and a piston mounted for reciprocation in the cavity in timed relation to the rotation of the turret. As the turret rotates, each mold is moved past a stationary feeding mechanism where meat from a supply source is forced into the mold cavity as the piston moves upwardly in the cavity. As the turret continues its rotation, the piston is moved downwardly in the cavity and the formed patty is ejected from the mold at a location substantially 180° away from the feeding mechanism. A patty separating device in the form of a continuous moving cut-off band is positioned at this location and effects separation of the formed patty from the bottom surface of the piston. The separated patty is then deposited on a moving conveyor.

In the aforementioned Orlowski U.S. Pat. No. 4,065,241 the feeding mechanism comprises a housing containing a pair of augers which feed the meat upwardly through an opening in a horizontal retaining plate which communicates with each mold opening successively as the turret rotates. The retaining plate is rigidly mounted on the frame of the apparatus and is positioned such that the bottom surface of the turret sweeps across the top surface of the retaining plate.

The Partos U.S. Pat. No. 3,633,245 describes a machine for forming meatballs or the like which also has a rotary turret with bottom opening mold cavities and reciprocable pistons and a feeding mechanism for forcing meat upwardly into the mold cavities. In this machine the feeding mechanism has a discharge head with an upper plate which engages the lower surface of the rotating turret. The upper plate of the discharge head is forced upwardly against the lower surface of the turret by a series of levelling studs coacting between the discharge head and the supporting framework of the machine.

SUMMARY OF THE INVENTION

The present invention is directed to improvements in a patty-forming apparatus of the rotating turret type described above which makes it possible to use frozen flake cut meat without the necessity of warming the meat to render it soft and plastic. As a result of the high operating speed of the machine, typically 400–450 patties per minute, the formed patties are essentially in the frozen state, which is a significant advantage not heretofore obtainable in machines of this type. The use of frozen meat, e.g. at a temperature of about 26° F. or lower, requires higher feed pressures than heretofore employed, and the present invention is directed to improved means for effecting a high pressure seal between the rotating turret and the stationary feed mechanism. The invention is also directed to certain improvements in the continuous moving cut-off band, which improvements are particularly advantageous when the apparatus is being used to process frozen meat.

Accordingly, a principal object of the present invention is to provide an improved apparatus for forming patties at high speed from an agglomerable edible material, particularly frozen flake cut meat.

A further object of the invention is to provide, in an apparatus of the foregoing type, improved means for providing an effective seal between the feeding mechanism and the rotating turret under the relatively high feed pressure required as a result of the use of frozen meat.

Another object of the invention is to provide, in an apparatus of the foregoing type, an improved separating means for effecting separation of the formed patties from the patty-forming mechanism.

Briefly described, the improved sealing means of the present invention comprises a vertically movable support for a feed spout assembly having a seal plate, and retractable fluid pressure applying means acting on the support to urge the seal plate under balanced pressure into sealing engagement with the bottom surface of the rotating turret. The upper surface of the seal plate is provided with a layer of sealing material having a low coefficient of friction, preferably an ultra high density polyethylene material. The feed spout assembly is detachably mounted on the support to permit easy removal of the feed spout assembly, for cleaning or the like, upon retraction of the fluid pressure applying means. The fluid pressure applying means is preferably an air inflatable and deflatable flexible bellows device commonly referred to as a pneumatic actuator or air bag.

In the present invention the continuous moving cut-off band, which serves to separate a formed patty from the bottom surface of a piston, is disposed at a slight inclination across its width as it enters the interface between the piston surface and the patty, and the leading corner of the piston is chamfered to facilitate entry of the leading edge of the band into the interface. The cut-off band is looped between a driving pulley and an idler pulley, and the pulleys have adjustable pivotable mountings for providing the desired degree of inclination of the band. In addition, a yieldable spring tensioned mounting is also provided for the idler pulley. To avoid undesirable accumulation of the meat or other edible material on the band, stationary scrapers are mounted so as to clean the outer surface of the band and one of the pulleys, and spray nozzles are arranged to direct sprays of cleaning liquid against the band and the pulley to wash away the scrapings.

Other features and advantages of the invention will be seen from the subsequent detailed description of the invention in conjunction with the accompanying drawings.

BRIEF DESCRIPTION OF THE DRAWINGS

FIG. 7 is an enlarged side elevational view as seen substantially along the line 7—7 of FIG. 1; and FIG. 8 is a fragmentary plan view as seen along the line 8—8 of FIG. 7.

DETAILED DESCRIPTION OF THE INVENTION

Figure 1:
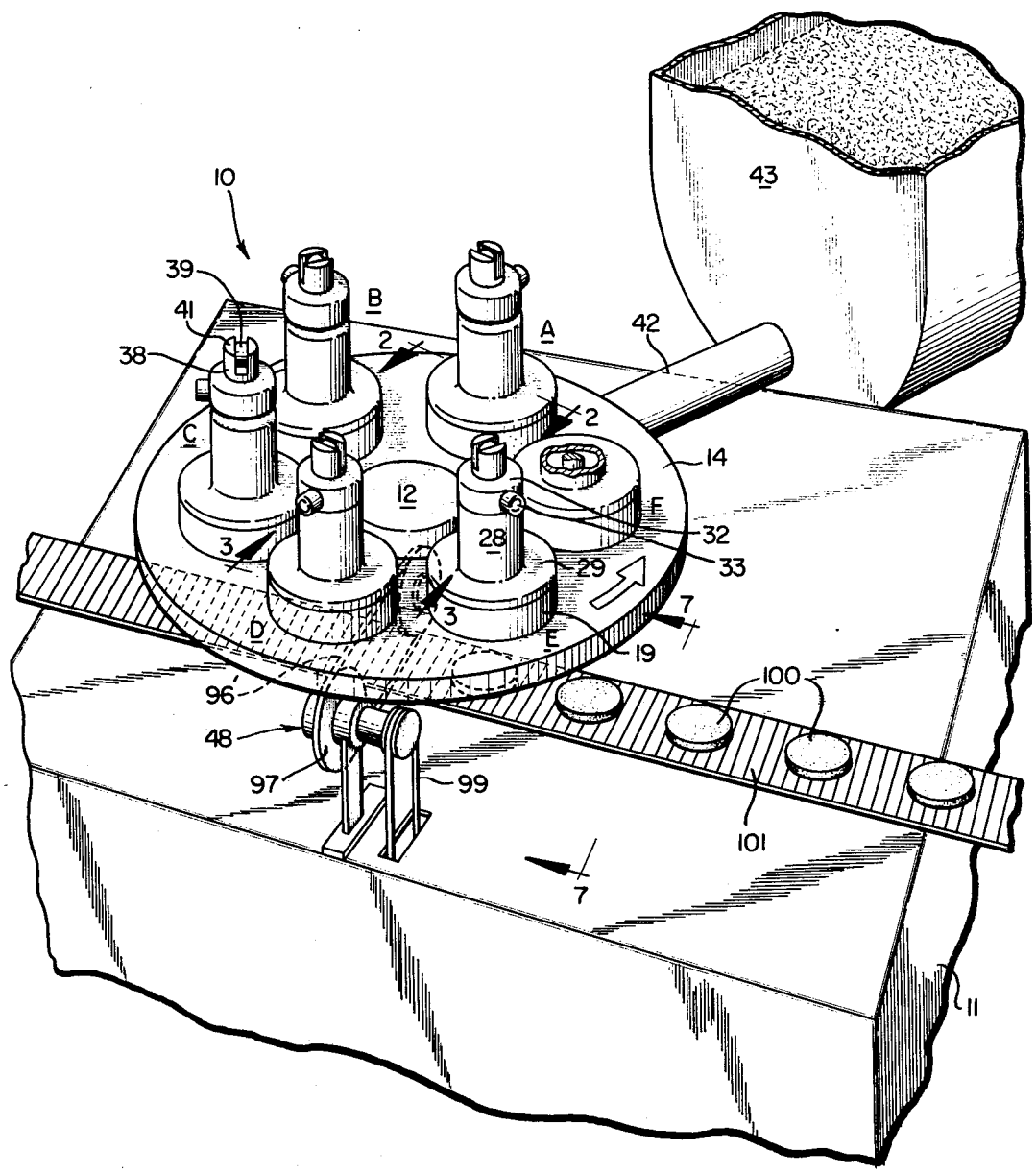
FIG. 1 is a perspective view of a preferred embodiment of the improved patty-forming apparatus of the present invention, with portions of the structure being omitted for clarity.

Referring to FIG. 1, a preferred embodiment of the improved patty-forming apparatus of the present invention is designated generally at 10, with portions of the structure being omitted for clarity.

The basic elements of the apparatus (i.e. a rotating turret with cavities, reciprocable pistons in the cavities, a feeding station at one side of the turret, and a patty-discharge and separating station at the opposite side of the turret) are shown in the prior Orlowski U.S. Pat. Nos. 3,982,035 and 4,065,241 which are incorporated herein by reference.

The apparatus includes an enclosed frame 11 upon which is mounted a suitable drive mechanism (not shown) for driving the various portions of the apparatus in timed relation. A vertical drive shaft 12 connected to the drive mechanism is supported on the frame 11 and carries at its upper end portion a disk-shaped turret or cavity plate 14. In FIG. 1 the respective rotary positions of the turret 14 are designated by the letters A through F.

Figure 2:
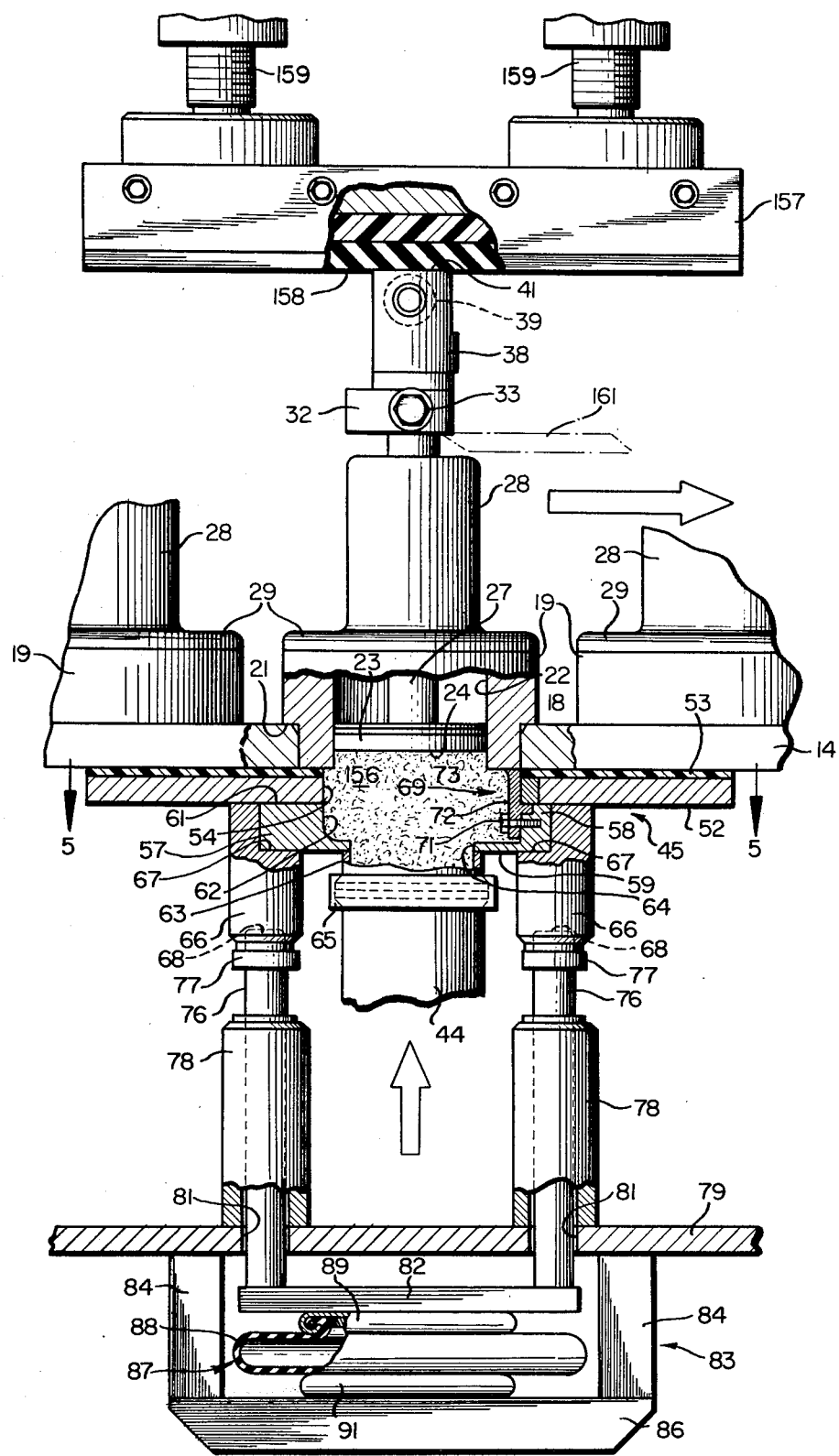
FIG. 2 is an enlarged vertical sectional view taken substantially on the line 2—2 of FIG. 1.
Figure 3:
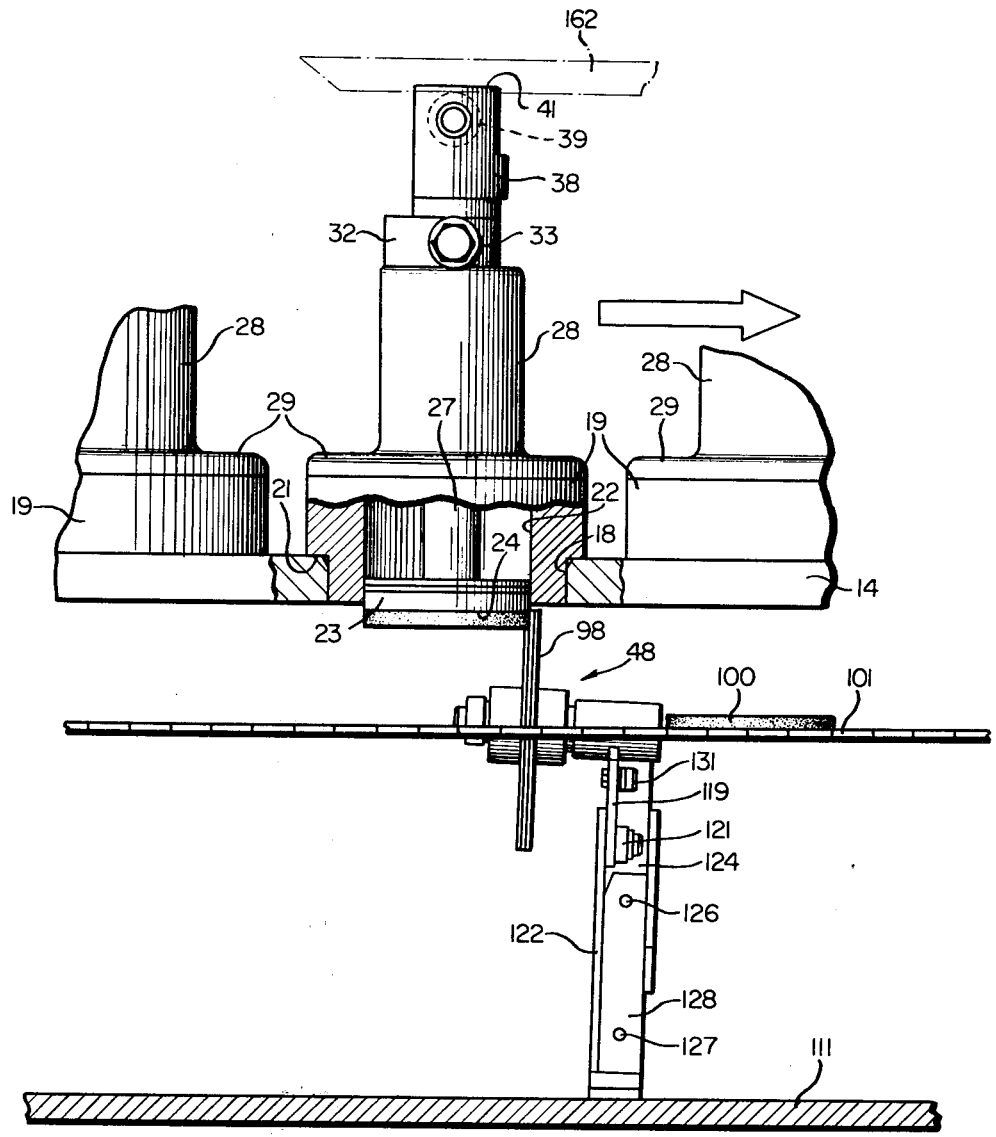
FIG. 3 is an enlarged vertical sectional view taken substantially on the line 3—3 of FIG. 1.
Figure 4:
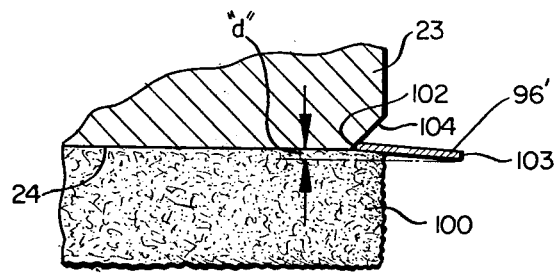
FIG. 4 is an enlarged fragmentary sectional view showing a detail of the structure illustrated in FIG. 3.

Referring particularly to FIGS. 2 and 3, the rotatable turret 14 has a plurality of vertically disposed circular openings 18 which are circumferentially spaced around the turret. An upright tubular cavity body member 19 extends into each opening 18 with a shoulder portion 21 seated against the upper flat surface of the turret 14. The inner cylindrical side wall 22 of the member 19 provides a cylindrical mold cavity, and each mold cavity has a cylindrical piston 23 disposed therein for vertical reciprocation. The flat bottom surface, designated at 24, of the piston 23 together with the cavity side wall 22 define the patty-forming mold. Each piston 23 is affixed to the lower end of an upright piston rod 27 which is reciprocably supported in a tubular bearing portion 28 of a cavity cap member 29 which is seated against the upper end portion of the cavity body member 19. A cam follower holder 32 is rigidly affixed to the piston rod 27 above the upper end of the bearing portion 28 and carries a cam follower or side roller 33 which projects laterally from the piston rod 27. A U-shaped yoke or holder 38 is secured to the upper end of the piston rod 27 and has mounted therein another cam follower or top roller 39 in vertical alignment with the piston rod 27. As seen in FIG. 2, the outer surface of the roller 39 is recessed slightly below the upper end surfaces 41 of the holder 38. As hereinafter described, the rollers 33 and 39 coact with suitably positioned cam tracks and a strike plate which comprise a control means for regulating reciprocation of the piston 23 in the cavity 22.

A feeding means comprising a feed device in a housing 42 is mounted on the frame 11 at a feed station (position A in FIG. 1) located at one side of the turret 14 for feeding the meat or other agglomerable edible material from a supply hopper 43 upwardly into each mold cavity 22 successively during rotation of the turret 14. Although any suitable feed device may be used, an auger type device known in the trade as a Moineau pump is preferred, as more fully described in the aforementioned Orlowski U.S. Pat. No. 4,065,241. The feed device communicates with an infeed elbow, shown fragmentarily at 44 in FIG. 2, which has a detachable connection with a feed spout assembly, designated generally at 45, which is positioned below the rotating turret 14. A patty separating means, indicated generally at 48, is also mounted on the frame 11 at a discharge station (position D in FIG. 1) located adjacent the turret 14 and approximately 180° away from the feed station. As described in more detail below, the patty separating means 48 comprises a continuous moving cut-off band disposed below the turret 14 in the path of rotation of the mold cavities.

Figure 5:
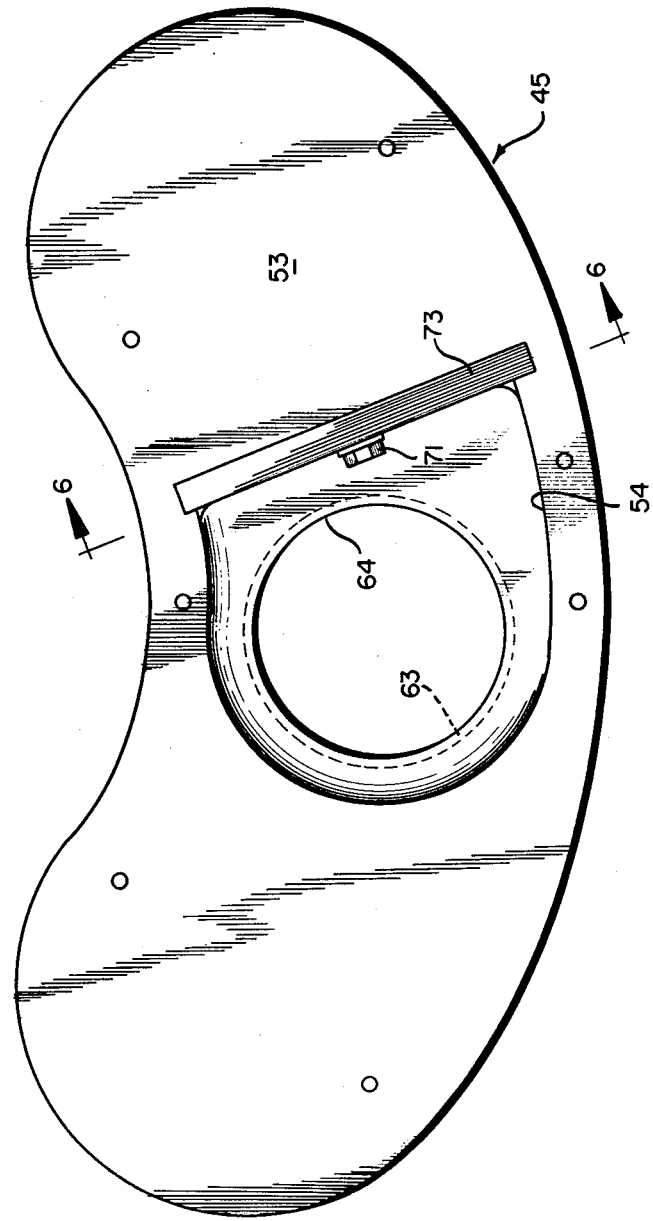
FIG. 5 is an enlarged plan view as seen along the line 5—5 of FIG. 2.
Figure 6:
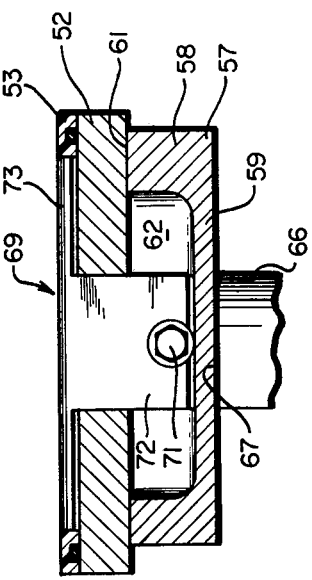
FIG. 6 is a transverse sectional view as seen along the line 6—6 of FIG. 5.

As previously explained, the present invention pertains to an improved means for effecting a seal between the feed spout assembly 45 and the rotating turret 14 which permits feeding of agglomerable edible material, particularly frozen flake cut meat, under substantial pressure from the feed device. Referring particularly to FIGS. 2, 5 and 6, the feed spout assembly 45 comprises an elongated generally arcuate seal plate 52 having on its upper surface a layer 53 of a suitable self-lubricating sealing material having a low coefficient of friction. The sealing material must be adapted to withstand the relatively high forces encountered when pressed against the bottom surface of the rapidly rotating turret 14 so that there is no detrimental wear or attrition of the layer 53 and no objectionable residue is deposited on the bottom surface of the turret 14. In addition, the sealing material must be one that is non-toxic and is approved by the regulatory authorities for use in a food processing environment. The preferred self-lubricating sealing material which meets these multiple requirements is an ultrahigh molecular weight, high density polymeric resin, e.g. the polyethylene resin offered by Hercules, Inc. under the trademark "1900 UHMW Polymer" and having a molecular weight range between 2 and 6 million.

The seal plate 52 and the layer 53 have a centrally located feed opening 54 which has an irregular and generally semi-elliptical configuration. An inlet means for the edible material is affixed to the bottom side of the plate 52 and comprises a shallow dish-shaped housing 57 having an upstanding peripheral side wall 58 and a bottom wall 59. The upper edge 61 of the side wall 58 engages the bottom surface of the seal plate 52, and the bottom wall 59 is spaced below the seal plate 52 to define an enlarged feed chamber 62 surrounding the feed opening 54. A tubular inlet stub 63 extends downwardly from a circular opening 64 in the bottom wall 59, and a removable clamp 65 provides a detachable connection between the inlet stub 63 and the infeed elbow 44.

The seal plate 52 has a pair of depending mounting members in the form of mounting posts 66 rigidly affixed at the bottom side of the seal plate 52 in spaced relation at opposite sides of the feed opening 54. The mounting posts 66 are notched or recessed, as at 67, to receive the housing 57 and are also provided with axially extending sockets 68 in their lower ends for receiving support members, as described below. A knife blade 69 is detachably secured to the inside of the side wall 58 of the housing 57 by means of a screw 71 extending through a mounting portion 72, and the blade 69 is positioned so that an elongated knife edge portion 73 is in operating alignment with the upper surface of the seal plate layer 53 and extends transversely across the trailing edge of the feed opening 54 as the mold cavities are rotated past the feed spout assembly 45.

In accordance with the present invention, the improved seal means includes vertically movable support means for supporting the feed spout assembly 45 below the rotating turret 14 at the feed station. As seen in FIG. 2, the support means comprises a pair of spaced upright thrust rods or posts 76 having annular retaining shoulders 77. The upper ends of the support posts 76 are removably received in the sockets 68 of the mounting posts 66 with the shoulders 77 abutting the ends of the mounting posts 66. The support posts 76 are vertically slidable in guide means comprising a pair of upright tubular bearing members 78 which are rigidly affixed to an apertured horizontal platform 79 constituting part of the frame 11. The lower ends of the support posts 76 project downwardly through enlarged apertures 81 in the platform 79 and are rigidly interconnected by a transverse connecting structure 82 so that the support posts 76 and the connecting structure 82 are movable as a unit. A retaining means is rigidly secured to the bottom of the platform 79 and comprises a U-shaped cradle structure, indicated generally at 83, having depending leg portions 84 secured at their upper ends to the platform 79 and a transverse portion 86 rigidly interconnecting the lower ends of the leg portions 84 and extending in parallel spaced relation below the transverse connecting structure 82 of the movable support means for the feed spout assembly 45.

A fluid pressure applying means 87 is interposed in operative relation between the transverse connecting structure 82 and the transverse portion 86 of the cradle structure 83 for transmitting a balanced upward pressure against the seal plate 52 and thereby urging the surface 53 of the seal plate 52 into sealing engagement with the bottom surface of the rotating turret 14. As shown in FIG. 2, the preferred fluid pressure applying means is a flat generally disk-shaped pneumatic bellows device known in the trade as an actuator or air bag. The device comprises an inflatable and deflatable flexible wall cylinder 88 enclosed between a pair of circular metal end plates 89 and 91 having a crimped bead connection to the bellows 88. The bellows 88 is formed from a heavy duty flexible material such as nylon reinforcing cords encased in neoprene rubber. An air inlet (not shown) is provided in the bottom end plate 91 and is connected to a source of pressurized air with suitable control means for inflating and deflating the device as desired. By way of example, the actuators or air bags offered by Firestone Industrial Products Company under the trademark "Airstroke" are particularly useful for the purposes of the present invention.

A pneumatic actuator or air bag of the type shown in FIG. 2 is a highly advantageous means of applying effective sealing pressure against the feed spout assembly 45 because of its compact size and configuration which enable it to meet the severe space limitations of the patty-forming apparatus. Since the device is hermetically sealed, it also affords important advantages from a sanitary viewpoint as required in food processing equipment. Furthermore, the device makes it possible to apply a controlled balanced pressure against the movable support for the feed spout assembly so that the elongated arcuate feed plate 52 is pressed against the bottom surface of the rotating turret 14 in a uniform manner to insure an effective seal over the entire contact area between the seal plate and the turret. Another important advantage of the device is that it is readily deflatable to permit the feed spout assembly 45 to be removed easily for cleaning and also for maintenance, e.g. replacement or repair of the knife blade 69. Thus, upon detachment of the clamp 65, the infeed elbow 44 can be swung away from the inlet stub 63 and the bellows 88 can then be deflated permitting the movable support 76-82 to drop downwardly a sufficient distance so that the feed spout assembly 45 can be lifted off of the support posts 76.

The improved patty separating means 48 of the present invention, as best seen in FIGS. 3, 4, 7 and 8 in conjunction with FIG. 1, comprises a continuous moving narrow cut-off band 96 which is looped around a drive pulley 97 and an idler pulley 98 so that the upper operating band portion 96' is positioned in the path of rotation of the turret 14 for effecting separation of a formed patty. The pulleys 97 and 98 are circumferentially grooved to receive the band 96, and the pulley 97 has a drive connection 99 with the drive mechanism of the apparatus for moving the band 96 in timed relation to the rotation of the turret 14. Preferably, the speed of the moving band 96 is such that a clean section of band is presented as each successive mold cavity moves into patty separating position.

As hereinafter described, when a mold cavity 22 reaches the cavity discharge and separating station, as shown at position D in FIG. 1, and in more detail in FIG. 3, the piston 23 is in its lowermost position and projects slightly below the bottom surface of the turret 14 for fully displacing a formed patty 100 from the mold cavity 22. However, because of the nature of the patty material, particularly in the case of frozen meat, the formed patty adheres to the bottom surface 24 of the piston and must be positively separated therefrom by the cut-off band 96. The elevation of the cut-off band is coordinated with the lowermost position of piston 23 so that the operating band portion 96' enters the interface between the piston surface 24 and the patty 100. The separated patty then falls onto a moving conveyor 101.

In accordance with the present invention, the band 96 is mounted so that the band portion 96' is disposed at a predetermined slight inclination from the horizontal across its width. This feature of the invention is shown on an exaggerated scale for clarity in FIG. 4 from which it is seen that the leading edge 102 of the band portion 96' as the band enters the interface between the piston surface 24 and the patty 100 is slightly elevated relative to the trailing edge 103 of the band. Stated more generally, the inclination is such that the leading edge 102 is closer to the piston surface 24 than the trailing edge 103. It has been found that the preferred inclination is such that the distance "d" between the parallel planes of the respective edges is about 0.002 inch for each ⅛ inch of band width. The inclination of the band portion 96' provides more effective separation of the patty 100 from the piston surface 24 and also functions to displace the separated patty from the piston surface so as to avoid the tendency of the patty to re-adhere itself to the piston surface at the high speed of rotation of the turret. As also seen in exaggerated form in FIG. 4, the leading corner edge of the piston 23 as it moves past the band portion 96' is beveled or chamfered, as at 104, in order to guide and facilitate entry of the band portion 96' into the interface between the piston surface 24 and the patty 100. The chamfered corner 104 also tends to cam the band portion 96' downwardly, thereby avoiding interfering engagement of the band with the end of the piston and possible band breakage in the event that the leading edge 102 of the band is not effectively aligned with the interface.

The desired inclination of the band portion 96' can be provided by any suitable means, e.g. by auxiliary idler rollers mounted on suitably inclined axes and engaging the band portion 96'. However, in the illustrated embodiment of the invention the desired inclination is obtained by means of adjustable supports for the pulleys 97 and 98 such that the axes of the pulleys can be tilted to provide the desired inclination of the band. This feature is shown in FIGS. 3 and 7, the inclined relationship of the parts in FIG. 3 being exaggerated somewhat for clarity.

The support for the driven pulley 97 comprises a bracket assembly including an adjustable angle member 106 having leg portions 107 and 108. The pulley 97 is rotatably supported on the leg portion 107, and the leg portion 108 is adjustably secured to a fixed upright support plate 109 extending upwardly from a base 110 secured to a platform 111 constituting part of the frame 11. The adjustable connection between the leg portion 108 and the fixed support plate 109 is provided by means of a pair of bolts 112 and 113, the upper bolt 112 extending through a vertical slot 114 in the support plate 109 and an aperture 116 in the leg portion 108, and the lower bolt 113 extending through a vertical slot 117 in the support plate 109 and a horizontally disposed slot 118 in the leg portion 108. Thus, the slots 114 and 117 permit vertical adjustment of the angle member 106 for vertically aligning the band portion 96' with the piston-patty interface, and the slot 118 permits slight pivotal movement of the angle member 106 about the bolt 112 as a pivot axis, whereby to impart the desired inclination to the axis of the pulley 97.

The idler pulley 98 is rotatably supported by another bracket assembly including a member 119 which is yieldably connected by pivot member 121 to the upper end of the leg portion 122 of an adjustable angle member 123. The other leg portion 124 of the angle member 123 is connected by means of bolts 126 and 127 to an upright support plate 128 fixed to a base 129 which is in turn mounted on the platform 111. The leg portion 124 and the plate 128 have an arrangement of slots and apertures similar to that provided in the bracket assembly for the pulley 97 in order to permit coordinated adjustment of the inclination of the axes of the pulleys 97 and 98.

A tension spring 130 has one end connected to a mounting screw 131 extending from the member 119 above the pivot 121 and its other end connected to a mounting block 132 secured to the upper end of a fixed support 133 carried by the base 129. Thus, the band 96 is yieldably tensioned between the pulleys 97 and 98 by the spring 130 acting on the pivotally mounted support 119 for the idler pulley 98. In the event of breakage of the band 96, a new band can be installed easily and quickly by disconnecting the spring 130, looping the new band around the pulleys 97 and 98, and reconnecting the tension spring 130. Furthermore, in the event of build-up of food or other extraneous material in the grooves of the pulleys, the spring tensioned mounting for the idler pulley 98 provides automatic compensation for any increased tension in the band 96. In addition, if there is unintentional misalignment of the band with the piston-patty interface, the yieldable mounting of the idler pulley 98 may avoid band breakage if the band is forcibly engaged by the projecting end of the piston.

A further feature of the present invention comprises an improved means for cleaning the band and one of the pulleys, as shown in FIGS. 7 and 8. As previously mentioned, the pulleys 97 and 98 have circumferential grooves indicated at 136 and 137, respectively, which receive the band 96. For optimum operation of the cut-off band it is important that the band be kept clean and free of accumulated meat or other edible material which tends to adhere particularly to the outer surface of the band portion 96' during its movement through the piston-patty interface. In accordance with the present invention, scraper means and liquid spray means are provided to clean the outer surface of the band portion 96' after it has moved away from a position closely adjacent the bottom surface of the turret but before it returns to operating position adjacent the turret surface. The scraper means also cleans the groove of the pulley around which the band portion 96' moves upon leaving the bottom surface of the turret.

An elongated horizontal support bracket 138 extends along one side of the drive pulley 97 at the lower portion thereof and is supported at one end in cantilever fashion from the upper end of an adjustable angle member 139 having leg portions 141 and 142. The leg portion 141 is adjustably mounted by means of bolts 143 and 144 on a fixed support plate 146 extending upwardly from the base 110. The leg portion 141 and the plate 146 are provided with the same general arrangement of slots and apertures heretofore described in connection with the pulleys so as to permit pivotal adjustment of the bracket 138 in unison with the bracket assemblies for the pulleys 97 and 98. The bracket 138 has an upstanding outer end with an upwardly angled scraper blade 147 adjustably mounted thereon by screws 148 so that the operating edge of the blade 147 is positioned at the outside of the pulley 97 where the band 96 is in contact with the pulley. The blade edge extends into the groove 136 of the pulley 97 and engages the outer surface of the band 96 for cleaning the latter. A downwardly angled scraper blade 149 is adjustably mounted at the opposite end portion of the bracket 138 by means of screws 151 so that the operating edge of the blade is positioned at the inside of the pulley 97 where the band 96 is out of contact with the pulley. The blade edge extends into the groove 136 of the pulley 97 and engages the base of the groove for cleaning the latter.

An upper liquid spray nozzle 152 is secured to the upper end of the leg portion 107 of the angle member 106 and is disposed at a downward angle for directing a spray of cleaning liquid around the scraper blade 147 so as to wash away the scrapings and provide a liquid coating on the outer surface of the band 96. Another liquid spray nozzle 153 is secured to the bracket 138 adjacent the scraper blade 149 for directing a spray of cleaning liquid into the groove 136 immediately below the scraper blade 149 to wash away the scrapings. The cleaning liquid supplied to the spray nozzles 152 and 153 may conveniently be hot water or a hot vegetable oil or the like which is compatible with meat or the other edible patty material and which is acceptable for food usage. A downwardly inclined housing, shown fragmentarily at 154, is provided around at least a portion of the pulley 97 and is suitably mounted on the leg portion 107 of the bracket assembly for the pulley 97. The liquid sprays from the nozzles 152 and 153 are directed into and are confined by the walls of the housing 154 so as to collect the spray liquid containing the scrapings and carry it away to waste or to filtration for recycle to the spray nozzles.

A typical operating cycle of the apparatus will now be described with particular reference to the mold positions designated at A–F in FIG. 1. During operation of the apparatus the reciprocation of the piston 23 is regulated in timed relation to the rotation of the turret 14 by suitable control means, including a plurality of stationary cam tracks cooperating with the rollers 33 and 39, so that the piston moves upwardly for filling the mold with edible material at the feeding station when the bottom opening of the mold cavity is in communication with the feed opening 54 of the feed spout assembly in one rotary position of the turret 14, and the piston moves downwardly for discharging a formed patty from the mold cavity at the discharge station in another rotary position of the turret 14 which is remote from the first mentioned position.

The cam tracks are constructed and positioned so that when a mold cavity 22 is completely aligned with the feed opening 54, as at position A of FIG. 1 and as seen in detail in FIG. 2, the rollers 33 and 39 are fully disengaged from the cam tracks and the piston 23 is free to move upwardly under the feed pressure of the upwardly moving edible material, designated at 156 in FIG. 2. The upward movement of the piston 23 continues until the upper end surfaces 41 of the yoke 38 abut against an adjustable upper strike plate 157 having a cushioned bump pad 158. The positive limitation on the upward stroke of the piston insures that the patties are always of uniform size and weight. The strike plate 157 is mounted on the frame 11 above the turret 14 and is vertically adjustable by means of a pair of elongated threaded screws 159 engageable with a hand operated worm gear mechanism (not shown). Thus, the upward stroke of the piston 23 is adjustable to determine the size of the mold cavity and the formed patty, and it is an important advantage of the apparatus that the size and weight of the patty can be accurately adjusted even while the machine is in operation.

As the turret 14 rotates away from position A, in a counterclockwise direction as viewed in FIG. 1, the underside of roller 33 is engaged by a flat portion of a first cam track, indicated schematically at 161 in FIG. 2, which holds the piston 23 in its uppermost position until the mold cavity 22 has completely cleared the feed opening 54 of the feed spout assembly 45. During movement of the filled mold cavity 22 past the feed opening 54, the knife edge 73 at the trailing edge of the feed opening 54 provides a clean cutting action to separate the portion of edible material in the mold cavity 22 from the main bulk of the edible material in the feed spout assembly 45. The knife edge 73 also functions to sever any chunks or strings of meat, or other edible material, which may be at the bottom of the cavity 22, thereby insuring an acceptable non-deformed bottom surface on the patty.

As the turret 14 continues to rotate to positions B and C of FIG. 1, the side roller 33 clears the first cam track portion 161, and thereafter the top roller 39 is engaged by an inclined portion of a second cam track (not shown) which fits between the sides of the U-shaped holder 38 to engage the roller 39. The second cam track forces the piston 23 downwardly in the mold cavity 22 until it reaches its lowermost position, at position D of FIG. 1 and as seen in detail in FIG. 3. The downward limit of piston movement is reached when the holder 32 engages the upper end of the bearing portion 28. As previously described, when the piston 23 reaches this lowermost position, the lower end of the piston projects slightly below the lower surface of the turret 14 and the formed patty 100 is adhered to the bottom surface 24 of the piston. The piston 23 is retained in its lowermost position by engagement of the top roller 39 with a flat portion of the second cam track, indicated schematically at 162 in FIG. 3, until the mold has moved past the patty separating means 48 where, as previously described, the cut-off band 96 passes through the interface between the piston surface 24 and the formed patty 100 and effects separation of the patty which falls onto the conveyor 101.

During continued rotation of the turret 14 away from position D to approximately position E, the top roller 39 clears the second cam track portion 162, and thereafter the underside of roller 33 is engaged by an inclined portion of a third cam track (not shown) which lifts the piston 23 slightly upwardly until the bottom surface 24 is in flush alignment with the bottom surface of the turret 14 preparatory to movement of the mold cavity to the feed station at position A. Just prior to reaching the feed station, e.g. at approximately position F, the side roller 33 clears the third cam track aand at the same time the top roller 39 engages a fourth cam track (not shown) which serves to limit upward movement of the piston 23 so that its bottom surface 24 is in flush alignment with the bottom surface of the turret 14 until the bottom opening of the mold cavity 22 is completely aligned with the feed opening 54. Thus, free upward movement of the piston 23 under the feed pressure of the meat or other edible material 156 cannot occur until the bottom opening of the mold cavity 22 is fully exposed to the feed opening 54 and the inlet chamber 62. When full alignment occurs, the top roller 39 disengages from the fourth cam track to allow free upward movement of the piston 23 as heretofore described.

As will be understood from the foregoing description, an improved sealing means is provided by the movable support 76–82 for the feed spout assembly 45 and the air bag device 87 which urges the seal plate 52 into sealing engagement with the bottom surface of the rotating turret 14. Although the arcuate seal plate 52 has a spaced two-point support on the posts 76, the arrangement is such that a uniform balanced pressure is exerted throughout the entire contact area between the seal plate and the turret. Typically the upper end plate 89 of the air bag 87 has a diameter of about 10 inches and the air pressure in the air bag is from about 60 to about 100 psi so that the upward force imposed on the movable support 76–82 is in the range of 4700 to 7800 pounds. Thus, the seal between the seal plate surface material 53 and the bottom surface of the turret 14 is effected at relatively high pressures as required to prevent leakage between the seal plate and the turret when frozen flake cut meat is being supplied at a relatively high feed pressure from the feed device. The use of ultra high density polyethylene, or equivalent material, for the seal plate layer 53 permits an effective high pressure seal at the high rotary speed of the turret 14 without detrimental erosion of the layer 53.

By means of the present invention, the frozen blade cut meat can be formed into patties without the necessity of warming the meat to 30° F. or higher, as was heretofore necessary. During the high pressure feeding of the frozen meat into the mold cavities the temperature of the meat may increase enough to effect momentary or localized melting so as to facilitate forming the meat into patties, but at the high production speed of the apparatus (e.g. 400 to 450 patties per minute for a six cavity turret) the formed patties are still in substantially frozen condition so that refreezing is not required. The use of a transversely inclined cut-off band, in the manner described, is also particularly advantageous when the apparatus is used with frozen meat because of the greater tendency of the frozen meat patties to stick to the bottom surfaces of the metal pistons. Furthermore, the scrapers and liquid spray nozzles described above also have special utility when forming patties from frozen meat.

Although the invention has been described above with particular reference to an illustrated specific embodiment of the invention, it is to be understood that various modifications and equivalent structures may be resorted to without departing from the scope of the invention as defined in the appended claims.

We claim:

1. In the method of forming patties from a mass of agglomerable edible material such as meat wherein said edible material is fed upwardly under pressure from a feed means having a feed opening into each of a plurality of upwardly extending cavities which are moved successively into and out of communication with said feed opening, each cavity having a piston reciprocably mounted therein and each piston having a bottom surface cooperating with the cavity to define a patty-forming mold with a bottom opening, each piston being movable upwardly in its cavity for filling the mold with said edible material when the bottom opening of the mold is in communication with said feed opening and the piston thereafter being movable downwardly for discharging a formed patty from the cavity when the botton opening of the mold is out of communication with said feed opening;

the improvement which comprises the steps of restraining upward mold filling movement of each piston in its cavity until the bottom opening of the cavity is substantially completely aligned with and substantially fully exposed to said feed opening, and then freeing the piston for upward mold filling movement under the pressure of the edible material from the feed means.

2. The method of claim 1 wherein said cavities are provided in a turret mounted for rotation on a vertical axis with said cavities extending upwardly from a bottom surface of the turret, and the bottom surface of each piston is held in substantially flush alignment with the bottom surface of said turret during said restraining step.

3. In an apparatus for forming patties from a mass of agglomerable edible material such as meat; said apparatus including a turret mounted for rotation on a vertical axis and having a plurality of cavities extending upwardly from the bottom surface of the turret, each cavity having a piston reciprocably mounted therein and each piston having a bottom surface cooperating with the cavity to define a patty-forming mold with a bottom opening;

feeding means cooperating with said turret for moving said edible material under pressure from a supply source upwardly into each mold successively during rotation of said turret relative to said feeding means;

said feeding means having a feed opening, and the bottom openings of said molds being adapted to be moved successively into communication with said feed opening during rotation of said turret;

control means regulating the reciprocation of each piston in its cavity in timed relation to the rotation of said turret, whereby said piston moves upwardly for filling the mold with said edible material when the bottom opening of the mold is in communication with said feed opening in a first rotary position of said turret and whereby said piston moves downwardly for discharging a formed patty from the cavity in a second rotary position of said turret which is remote from said first rotary position; and means for separating a formed patty from the bottom surface of said piston;

the improvement wherein said control means comprises means for limiting the upward movement of said piston during rotation of said turret from said second rotary position to said first rotary position so that the bottom surface of the piston is in substantially flush alignment with the bottom surface of said turret until the bottom opening of the cavity is substantially completely aligned with and substantially fully exposed to said feed opening.

4. The apparatus of claim 3 wherein said means for limiting upward movement of said piston comprises cam means operatively coacting with the piston to limit the extent of upward movement of the piston.

5. The apparatus of claim 3 wherein said means for limiting upward movement of said piston comprises lift cam means operatively coacting with the piston for moving the piston upwardly during rotation of said turret away from said second rotary position so that the bottom surface of the piston is in substantially flush alignment with the bottom surface of said turret, and hold-down cam means thereafter operatively coacting with the piston to retain said substantially flush alignment until said turret reaches said first rotary position.

6. The apparatus of claim 3 wherein said control means comprises abutment means operatively coacting with said piston for limiting the uppermost position of the piston during filling of the mold at said first rotary position of said turret, first cam means operatively coacting with said piston during continued rotation of said turret to hold the piston in said uppermost position until the bottom opening of the mold clears said feed opening, second cam means thereafter operatively coacting with said piston to move the piston downwardly to its lowermost position in which the piston projects slightly below the bottom surface of said turret for discharging the formed patty from the cavity at said second rotary position of said turret and to retain the piston in said lowermost position until the mold has moved past said patty-separating means, third cam means thereafter operatively coacting with said piston to move the piston upwardly during rotation of said turret away from said second rotary position until the bottom surface of the piston is in substantially flush alignment with the bottom surface of said turret, and fourth cam means thereafter operatively coacting with said piston to limit upward movement of the piston and to retain said substantially flush alignment until the bottom opening of the cavity is substantially completely aligned with and substantially fully exposed to said feed opening at said first rotary position of said turret.

7. The apparatus of claim 6 wherein said piston has an upwardly extending piston rod, a holder at the upper end of said piston rod, a top cam follower mounted on said holder, a side cam follower mounted on said piston rod below said top cam follower, said abutment means is adapted to be engaged by said holder, said side cam follower is adapted to be engaged by said first cam means and by said third cam means, and said top cam follower is adapted to be engaged by said second cam means and by said fourth cam means.

8. The apparatus of claim 7 wherein said holder comprises a yoke member having spaced sides with upper end surfaces, said top cam follower comprises a top roller mounted in said yoke member between said sides and in recessed relation below said upper end surfaces, said side cam follower comprises a side roller projecting laterally from said piston rod, said first cam means and said third cam means comprise cam track portions adapted to engage the underside of said side roller, and said second cam means and said fourth cam means comprise cam track portions adapted to fit between said sides of said yoke member and to engage said top roller.

* * * * *